United States Patent [19]

Heymans

[11] Patent Number: 5,279,733

[45] Date of Patent: Jan. 18, 1994

[54] FILTER CANDLE APPARATUS

[75] Inventor: Paul Heymans, Sart-Lez-Spa, Belgium

[73] Assignee: Southwest Screens & Filters, S.A., Sprimont, Belgium

[21] Appl. No.: 938,890

[22] Filed: Aug. 31, 1992

[51] Int. Cl.$^5$ .............................................. B01D 27/00
[52] U.S. Cl. ................... 210/232; 210/323.2; 210/485
[58] Field of Search .................. 210/232, 315, 323.2, 210/342, 435, 437, 485

[56] References Cited

U.S. PATENT DOCUMENTS

| 3,189,179 | 6/1965 | McMichael | 210/315 |
| 4,248,713 | 2/1981 | Meier | 210/232 |
| 5,015,375 | 5/1991 | Fleck | 210/232 |
| 5,043,068 | 8/1991 | Karbachsch et al. | 210/350 |
| 5,076,917 | 12/1991 | Luhrmann et al. | 210/232 |
| 5,112,503 | 5/1992 | Raifman | 210/232 |
| 5,200,077 | 4/1993 | McNeice et al. | 210/333.1 |

Primary Examiner—Stanley S. Silverman
Assistant Examiner—Robert James Popovics
Attorney, Agent, or Firm—Hardaway Law Firm

[57] ABSTRACT

A filter candle apparatus is provided comprising an elongated mesh pack defining an axial opening therethrough and having an end cap fixedly secured to one end and an end fitting fixedly secured to the opposite end, the end fitting defining an opening therethrough which is coaxial with the axial opening of the mesh pack, a hollow core tube defining a plurality of openings therein positioned within the axial opening of the mesh pack and being removably slidable therethrough, the core tube having an end member surrounding one end thereof that engage the end fitting of the mesh pack, a ring-shaped bearing recessedly held within and by the end fitting of the mesh pack and engaging the core tube proximate the end member, and an outer guard defining apertures therein adjacently surrounding the mesh pack.

7 Claims, 2 Drawing Sheets

FILTER CANDLE APPARATUS

BACKGROUND OF THE INVENTION

This invention relates generally to filtration devices, and more particularly to filter media material for polymer filtration.

Various apparatuses exist within the prior art relating to filter media material for polymer filtration. Such apparatuses utilize a metal filtration media in order to obtain the desired characteristics for polymer filtration. Typical properties desired for such filtration relate to strength, temperature, chemical resistance and media migration. Various structures of metal filtration media can be utilized in apparatuses designed for polymer filtration, and numerous factors can be considered when evaluating the various media.

There are various types of filter elements utilizing different types of filter media including flat filters, candle and basket filters, and disc filters. In the art of filter candles, it has been common in the past to provide some of the filtration components as an integral unit in order to prevent leakage therebetween. As a result, cleaning of the filtration components is quite difficult, and a problem with a specific component of the filtration device means replacement of all components which are an integral part thereof.

In light of the prior art filtration devices, there exists much room for improvement in the art of filter elements for polymer filtration.

SUMMARY OF THE INVENTION

It is therefore an object of this invention to provide a novel filtration device for polymer filtration.

It is another object of this invention to provide a filter candle apparatus with improved characteristics and features.

These as well as other objects are accomplished by a filter candle apparatus comprising an elongated mesh pack defining an axial opening therethrough and having an end cap fixedly secured to one end and an end fitting secured to an opposite end, a hollow core tube defining a plurality of openings therein positioned within the axial opening of the mesh pack and being removably slidable therethrough, a ring-shaped bearing recessedly held within and by an end fitting of the mesh pack and engaging the core tube proximate the end member, and an outer guard defining apertures therein adjacently surrounding the mesh pack.

DETAILED DESCRIPTION

In accordance with this invention, it has been found that a novel filtration device for polymer filtration can be provided. It has also been found that according to this invention, a filter candle apparatus with improved characteristics and features can be provided. Further advantages and features will become apparent from a reading of the following description given with reference to the various figures of drawings.

Figures 1, 2:
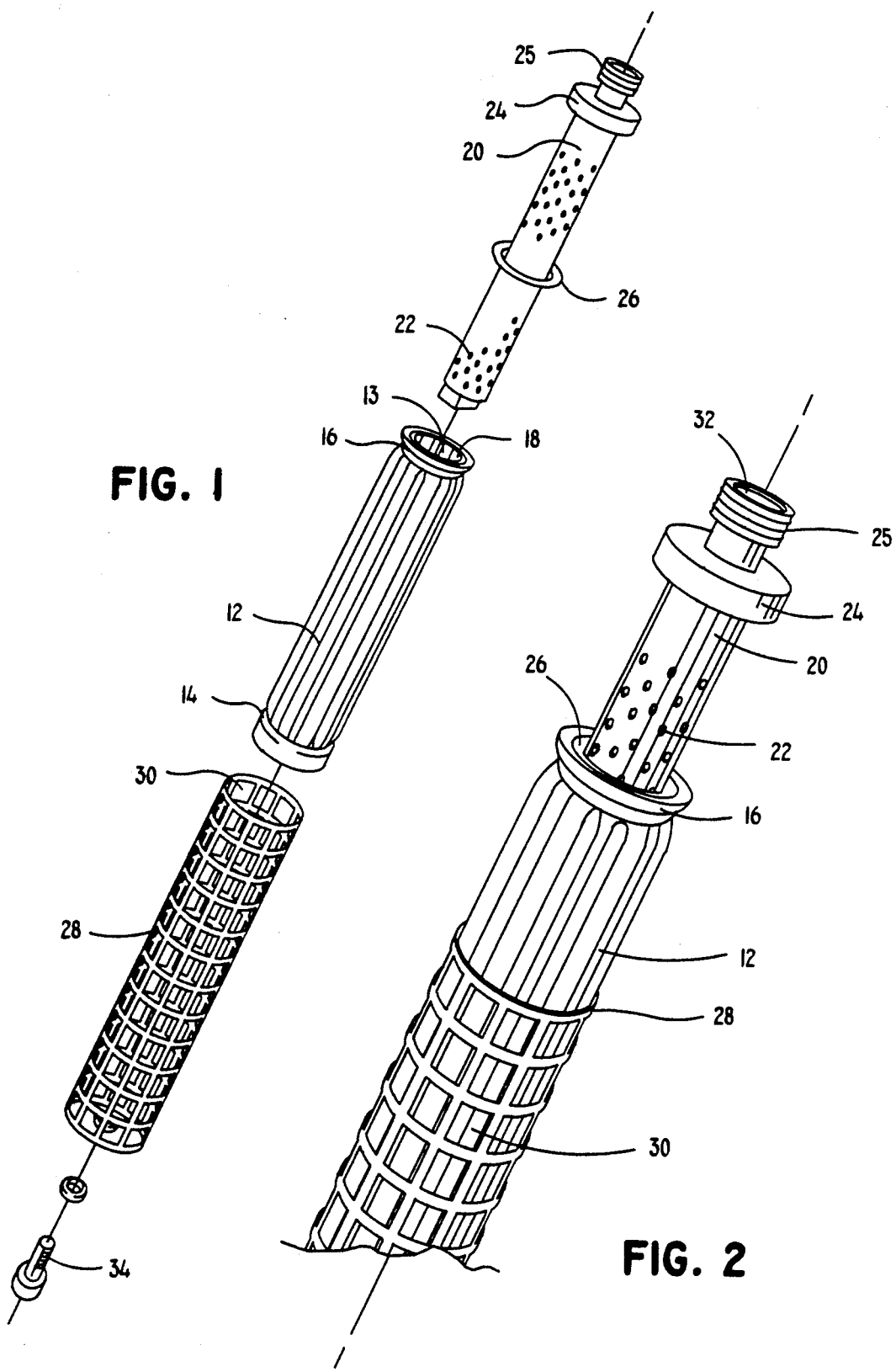
FIG. 1 of the drawings is an assembly view of a filter candle apparatus according to this invention illustrating the individual components.
FIG. 2 of the drawings is a perspective view of a filter candle apparatus according to this invention shown partially assembled.

FIG. 1 of the drawings is an assembly view of a filter candle apparatus 10 according to this invention. As illustrated, filter candle apparatus 10 comprises three completely separable components with mesh pack 12 illustrated in the middle of the assembly view. Mesh pack 12 is elongated and defines an axial opening 13 therethrough. An end cap 14 is fixedly secured to one end of mesh pack 12 and an end fitting 16 is fixedly secured to an end opposite end cap 14. End fitting 16 defines an opening 18 therethrough which is coaxial with axial opening 14 of mesh pack 12. End fitting 16 defines a recess adapted to receive a ring-shaped bearing which prevents any leakage between mesh pack 12 and core tube 20.

Figure 3:
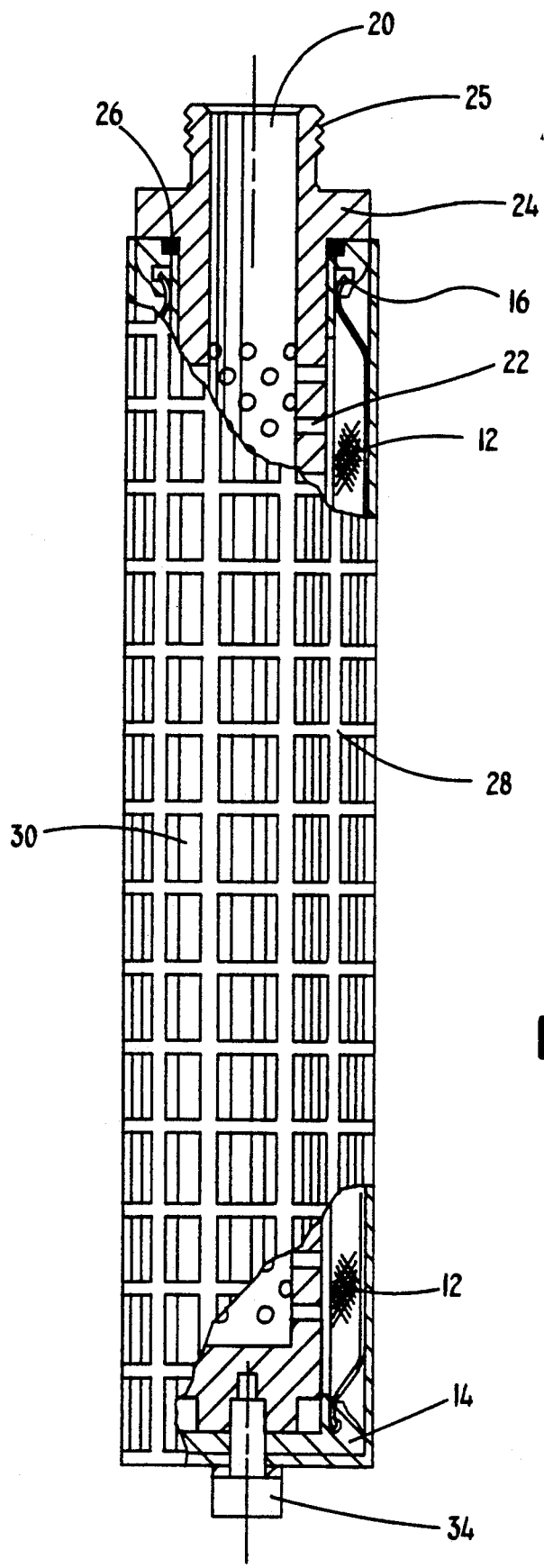
FIG. 3 of the drawings is an elevational side view in partial section of a filter candle apparatus according to this invention.

Mesh pack 12 acts as a filter for filter candle apparatus 10 and can comprise a variety of metal weaves. Once filter candle apparatus 10 is assembled, as illustrated in FIG. 3, mesh pack 12 is easily removable therefrom so it can be exchanged for another one when needed. This advantageous feature lowers costs associated with replacement of the filter element since only the mesh pack needs replacing. This cost savings will make the cleaning of the filter element further unjustified which will also avoid the handling of the dangerous cleaning chemicals. Should cleaning be desired, mesh pack 12 can be isolated during the cleaning process which results in an easier and more effective cleaning attributed to a longer on-stream life and more cleaning cycles of the element.

A hollow core tube 20 is illustrated in FIG. 1 as adapted to be slidably positioned within mesh pack 12. Core tube 20 defines a plurality of openings 22 therein, and core tube 20 has an end member 24 which is enlarged and which is adapted to engage end fitting 16 of mesh pack 12 in a flush manner. Extending from end member 24 of core tube 20 is the end of core tube 20 which can be threaded so as to be fittable to other components as illustrated by threaded end 25 in the preferred embodiment. Core tube 20 provides internal support for filter candle apparatus 10.

It is therefore seen that core tube 20 is designed to be slidably positioned within mesh pack 12 through end fitting 16 and is adapted to be slidably removed therefrom likewise. A ring-shaped bearing 26 is recessively held within the recessed defined in end fitting 16 of mesh pack 12 and is designed to engage core tube 20 proximate end member 24 when core tube 20 is fitted within mesh pack 12. Ring-shaped bearing 26 allows core tube 20 to be fitted within mesh pack 12 with end member 24 and end fitting 16 forming a leak-proof seal. Ring-shaped bearing 26 can be separated from mesh pack 12 in order to be re-used in a newly acquired or cleaned mesh pack.

Further illustrated in FIG. 1 is an outer guard 28 which defines apertures 30 therein. Outer guard 28 is designed to fittingly receive mesh pack 12 such that mesh pack 12 fills the inner space defined by outer guard 28. When assembled in the preferred embodiment, the end of core tube 20 which is opposite threaded end 25 defines an opening therein for receiving some type of fastening means such as screw 34 for securing core tube 20, mesh pack 12, and outer guard 28 together.

Various advantages exist by utilizing outer guard 28 with filter candle apparatus 10. Such advantages include protecting the inner components such as mesh pack 12 and core tube 20 from mechanical damage and avoiding ballooning of any components, such as mesh pack 12, when pressure is reversed. Some disadvantages also exist such as a loss of effective filter area and higher pressure losses. Accordingly, it is envisioned according to this invention that filter candle apparatus 10 can function without outer guard 28. The easy removability of outer guard 28 allows it to be used or removed as desired.

FIG. 2 of the drawings is a perspective view of filter candle apparatus 10 in partially assembled form according to this invention. As illustrated, core tube 20 is shown partially withdrawn from mesh pack 12 and likewise, mesh pack 12 is illustrated as partially withdrawn from outer guard 28. A significant advancement in the art of filter candle apparatuses exists in that core tube 20 and mesh pack 12 are separable from one another but can still perform as though the structure was an integral structure by not allowing material filtered in through mesh pack 12 and core tube 20 to leak from the seal formed by end member 24 and end fitting 16. It is the ring-shaped bearing 26 that fits within the recess in end fitting 16 of mesh pack 12 that plays a significant role in providing such a feature. In the preferred embodiment, ring-shaped bearing 26 defines an arcuate surface and is curved downward toward end fitting 16 of mesh pack 12 to provide a tight seal between end fitting 16 and end member 24 on core tube 20, whereby the seal becomes tighter as pressure of material passing through core tube 20 is increased. Core tube 20 as illustrated in FIG. 2 of the drawings defines an axial opening 32 extending therethrough for passage of material through filter candle apparatus 10.

FIG. 3 of the drawings is a partial front elevational view of filter candle apparatus 10 according to this invention. Filter candle apparatus 10 is shown in its fully assembled embodiment with core tube 20 positioned within mesh pack 12 which is positioned within outer guard 28. Each of these separate components are secured together by screw 34 which extends into core tube 20 through mesh pack 12 and outer guard 28.

Metal filtration media are used exclusively for all components in the preferred embodiment of this invention. The use of metal filtration media provides excellent features regarding strength, ability to be used in a wide range of temperatures, chemical resistance, and ability to provide for no media migration. Different metal media materials include plain steel, alloyed steel, and non-ferrous materials such as bronze, copper and aluminum.

It is therefore seen that the present invention provides a novel filtration device for polymer filtration. It is further seen that the present invention provides a filter candle apparatus with improved characteristics and features for polymer filtration. Many other advantages and features will become apparent to one skilled in the art from a reading of the following appended claims.

That which is claimed:

1. A filter candle apparatus comprising:
   an elongated mesh pack defining an axial opening therethrough, said mesh pack having an end cap fixedly secured to one end and an end fitting fixedly secured to an end opposite said end cap, said end fitting defining an opening therethrough co-axial with said axial opening of said mesh pack and having a recess defined therein;
   a hollow core tube defining a plurality of openings therein positioned within said axial opening of said mesh pack and being removably slidable therethrough, said core tube having an end member surrounding one end thereof, said end member engaging said end fitting on said mesh pack; and
   a ring-shaped bearing recessedly held within and by said recess of said end fitting circumjacent to said opening defined by said end fitting, said ring-shaped bearing engaging said core tube proximate said end member;
   wherein material can be filtered through said mesh pack and said core tube to pass into said core tube and exit through an axial opening defined in one end thereof.

2. A filter candle apparatus according to claim 1 further including an outer guard defining apertures therein adjacently surrounding said mesh pack.

3. A filter candle apparatus according to claim 2 wherein said outer guard, said mesh pack and said core tube are securely held together by fastening means.

4. A filter candle apparatus according to claim 1 wherein said ring-shaped bearing defines an arcuate surface.

5. A filter candle apparatus according to claim 4 wherein said arcuate surface curves downward toward said end fitting of said mesh pack to provide a tight seal between said end fitting and said end member on said core tube, whereby said seal becomes tighter as pressure of material passing through said core tube is increased.

6. A filter candle apparatus according to claim 1 wherein said core tube is perforated.

7. A filter candle apparatus according to claim 1 wherein said core tube is threaded on said end proximate said end member.

* * * * *